United States Patent [19]

Kvasnicka

[11] Patent Number: 5,039,866
[45] Date of Patent: Aug. 13, 1991

[54] NUCLEAR TRACK DETECTOR METHOD FOR RADON MONITORING IN BUILDINGS THROUGH THE 210 POLONIUM MEASUREMENT ON GLASS

[76] Inventor: Jiri Kvasnicka, 7 Stewart Court, Darwin Nt 0812, Australia

[21] Appl. No.: 432,882

[22] Filed: Nov. 7, 1989

[51] Int. Cl.$^5$ .................................................. G01T 5/10
[52] U.S. Cl. ................................ 250/472.1; 250/475.2; 250/482.1
[58] Field of Search ............... 250/472.1, 473.1, 475.2, 250/482.1

[56] References Cited

U.S. PATENT DOCUMENTS

| | | | |
|---|---|---|---|
| 3,493,751 | 2/1970 | Davies et al. | 250/473.1 |
| 3,922,555 | 11/1975 | Chapuis et al. | 250/472.1 |
| 4,338,523 | 7/1982 | Alter | 250/492.1 |
| 4,778,992 | 10/1988 | Wheeler | 250/255 |
| 4,920,272 | 4/1990 | Yoder | 250/475.2 |

Primary Examiner—Constantine Hannaher
Assistant Examiner—Edward J. Glick

[57] ABSTRACT

An in-situ method for monitoring of retrospective long-term radon exposures in dwellings is disclosed. Typically one nuclear track detector is placed on a glass surface to measure the alpha track density due to the glass alpha activity background plus the glass surface alpha activity of 210Po. The second nuclear track detector is placed on the glass surface with removed 210Po surface activity to measure the alpha tract density which is due to the alpha activity background of the glass. The plate-out on glass of short lived 222Rn decay products in the air is the major source of 210Pb and 210Po activities on the glass surface. The retrospective radon exposure is calculated from the alpha track density corresponding to the 210Po activity on the glass surface which is the difference of the alpha track densities measured by the two nuclear track detectors.

1 Claim, No Drawings

NUCLEAR TRACK DETECTOR METHOD FOR RADON MONITORING IN BUILDINGS THROUGH THE 210 POLONIUM MEASUREMENT ON GLASS

REFERENCES

1. Kvasnicka, J., 'Theory of Alpha Activity Measurement by Nuclear Track Detectors', Int. J. Radiat. Instrum., Part D, Nucl. Tracks Radiat. Meas., Vol. 11, Nos ½ (1986), pp. 81–84.
2. Samuelsson, C., 'Retrospective Determination of Radon in Houses', Nature, Vol. 334, July 28 (1988), pp. 338–340.

This invention pertains to the monitoring technique using a nuclear track detector film for the 210Po monitoring on the glass surface and long-term radon exposure monitoring.

The present invention is a significant advancement and improvement in the field of the radon exposure monitoring in houses and environment.

Exposures of the population to alpha radiation of inhaled radon decay products (radon daughters) are responsible for a significant lung cancer rate. The monitoring of radon and radon daughters in dwellings is thus of growing importance and has already been carried out in a number of countries.

Radon and radon daughters in the air are monitored by various techniques based on either passive or active type of detection. The main disadvantage of the above mentioned techniques is their inability to monitor a retrospective exposure of an individual to radon in a house.

An attempt has been made to measure retrospective radon exposures by measuring the 210Po alpha activity on glass by a pulse ionization chamber. The main disadvantage of this technique is its destructiveness of glass that makes the technique too expensive. A large sample of glass needs to be cut from a glass window sheet for a laboratory analysis of the surface alpha activity of 210Po in the pulse ionization chamber.

None of the prior techniques for radon monitoring in houses have succeded in a large scale monitoring of retrospective exposures of pupulation to radon.

SUMMARY

The present invention possesses the capabilities, among others, of substantially improving accuracy of assessments of long-term retrospective radon exposures in houses and in the environment. The invented method is the only method which can be used in a large scale for the assessment of long-term retrospective radon exposures.

The system of two nuclear track detector films is exposed to alpha radiation in a close contact with the glass surface over the period of a few months. After the exposure the detector films are developed and the alpha activity of 210Po is assessed by the counting of alpha particle tracks on the nuclear track detector films. A relatively simple evaluation of the exposed nuclear track detector films enables a massive involvement of the nuclear track detector technique in the monitoring of radon in houses and in the environment.

A more complete and thorough understanding of the invention can be obtained by reference to the detailed description of its prefered embodiment.

PREFERED EMBODIMENT

The plate-out on glass of short lived radon daughters in the air is the major source of 210Pb and 210Po on the glass surface. Because of a long half-life of 210Pb (22.3 years) the 210Pb activity and also its daughter 210Po activity on the glass grow in time and reflect the time integral exposure of the glass surface to radon and radon daughters in the air.

The nuclear track detector technique is used for the 210Po alpha activity monitoring on the glass surface. The two nuclear track detector film configuration method is an optimal method for the 210Po activity monitoring on the glass surface. The method is now described in detail.

DESCRIPTION OF THE METHOD

Two nuclear track detector films are used for the 210Po alpha activity monitoring on the glass. Both detector films detect only alpha particles emitted from the glass with the energies which are approximately 4 MeV–7 MeV. Primary alpha particle energy of 210Po is 5.3 MeV.

The first detector film is exposed to the background alpha activity of glass as well as the alpha activity of 210Po on the glass surface.

The second detector is exposed to the glass surface from which surface the alpha activity of 210Po was removed by a wet 1200 grade fast cut water proof sand paper. This detector is used for the evaluation of the background alpha activity with respect to the alpha particle track density due to the contamination of glass by natural radionuclides of the uranium and thorium decay series.

The difference between the readings of the first and the second detector is the net alpha track density, NT, proportional to the surface alpha activity of 210Po on glass.

EXPERIMENTAL PROCEDURE

Even though most of the commercial alpha particle sensitive nuclear track detectors can be used for the monitoring of the 210Po activity on the glass surface the method based on a coloured cellulose nitrate nuclear track detector film is described in detail.

The cellulose nitrate nuclear track detector film detects alpha particles with energies approximately between 0.8 MeV and 4 MeV. The maximum detection efficiency is between 1.2 MeV and 3 MeV. This detection efficiency is achieved if the exposed detector film is etched in 10% NaOH solution so that 29% of original 1.9 mg/cm$^2$ sensitive layer of the cellulose nitrate is etched away. The alpha particle tracks in the cellulose nitrate film are usually well developed if the exposed film is etched for 9 hours at 40° C. in 10% solution of NaOH (reference 1). Longer etching time means that the detector is able to detect alpha particles of higher energies between 3 MeV–4 MeV with higher detection efficiency.

A 1.5×1.5 cm$^2$ piece of the cellulose nitrate nuclear track detector film is wrapped in an aluminized polyester foil that can be 1.7 mg/cm$^2$ to 2.5 mg/cm$^2$ thick (one single layer of the foil must be maintained between the sensitive side of the detector film and the glass surface). The thin polyester foil degradates the primary alpha particle energies of 210Po so the resulting energies of alpha particles are between 1 MeV and 4 MeV. Alpha particles with these energies can be detected. Two such detectors are used to measure the alpha activity of 210Po on glass and thus the long-term exposure to radon in the air.

The first detector is fixed by a piece of a sticky tape on the glass surface. This detector is used to assess the bulk glass surface alpha activity which includes the background and the 210Po alpha activity on the glass surface.

The second detector is fixed, as mentioned above, on an area of glass which surface alpha activity of 210Po was removed by rubbing an area of about $5 \times 5$ cm$^2$ with a wet 1200 grade fast cut water proof sand paper (one minute rubbing is sufficient to remove 210Po from the surface quantitatively) and the surface was rinsed with the demineralized water and dried out with a soft tissue.

After a few month exposure both detectors are removed from the glass surface and the latent alpha particle tracks are developed by etching the film in the 10% solution of NaOH as mentioned before.

The track densities are assessed by counting the tracks on the detector films using an optical microscope. Only the tracks etched through a thin layer of the cellulose nitrate film are counted. The net track density, NT (cm$^{-2}$), which corresponds to the 210Po alpha activity on the glass surface is calculated by subtracting the background track density, BT (cm$^{-2}$), assessed by the second detector from the total alpha track density, TT (cm$^{-2}$), of the first detector.

NT is proportional to the detector exposure time, DE (second), whilst the detectors were exposed to the glass alpha activity, average radon activity, RA (Bq/m$^3$), in the air and the glass exposure time, GE (year), which in majority of cases equals to the glass age. The 210Po alpha activity on the glass, PA (Bq/cm$^2$), depends on the radon activity and the exposure time of the glass.

The formula (1) gives the link between NT and PA $$(NT) = (CC)(PA)(DE), \quad (1)$$

where CC is dimensionless calibration constant for the cellulose nitrate nuclear track detector that depends on the etching conditions, the thickness of the polyester alpha particle energy degradation foil between the detector film and the glass surface, and on the alpha track counting method.

The 210Po alpha activity, PA, radon activity, RA, and glass exposure time, GE, satisfy the following formula $$(PA) = (CF)(RA)(GE), \quad (2)$$

where CF = $1.10^{-7}$ (Bq.cm$^{-2}$/Bq.m$^{-3}$ year) is the conversion factor between the radon exposure, (RE) = (RA)(GE) (Bq.m$^{-3}$ year), and the 210Po activity, PA, on the glass surface (reference 2).

The radon exposure can be expressed in this form $$(RE) = \frac{(NT)}{(DE)(CC)(CF)} \quad (3)$$

EXAMPLE

The cellulose nitrate detector films wrapped in the aluminized polyester foil 2.3 mg/cm$^2$ thick were exposed during the period of 3 months in several indoor locations to the alpha activity of the glass window sheets.

The detector films were then etched in the 10% solution of NaOH so that 33% of the original cellulose nitrate detection film was removed by etching.

The alpha particle tracks were counted using the optical microscope ($10 \times 40$ magnification was used).

The alpha particle track densities TT, BT, NT, detector exposure times, DE, and glass exposure times, GE, are summarized in Table 1. Calculated radon exposures, RE, and long-term average radon activities, RA, are in columns 7 and 8 of the Table 1. Short-term indoor radon activities, measured during the periods no shorter than 20 days, are in the last column of the Table 1 for comparison with the results obtained through the monitoring of the 210Po activity on glass by the nuclear track detection method.

The calibration constant, CC=0.21, has been assessed on the basis of an independent calibration experiment (330Th alpha source of known activity was used for the calibration).

Preferred embodiment of the present invention has been shown and described with degree of particularity. It should be understood, however, that such description has been made by way of preferred embodiment and that certain changes may be made without departing from the scope of the invention defined by appended claims:

TABLE 1

| Site | TT | BT (cm$^{-2}$) | NT | DE (s) | GE (year) | RE (Bq·m$^{-3}$·y) | RA (Bq·m$^{-3}$) | RA* (Bq·m$^{-3}$) |
|---|---|---|---|---|---|---|---|---|
| 1 | 1318 | 227 | 1091 | $7.41 \cdot 10^6$ | 8.5 | 7010 | 825 | 650 |
| 2 | 420 | 213 | 207 | $7.41 \cdot 10^6$ | 8.5 | 1330 | 157 | 140 |
| 3 | 298 | 184 | 114 | $7.41 \cdot 10^6$ | 8.5 | 731 | 86 | 75 |
| 4 | 216 | 165 | 51 | $7.35 \cdot 10^6$ | 8 | 328 | 41 | 60 |
| 4 | 243 | 174 | 56 | $7.35 \cdot 10^6$ | 8 | 360 | 45 | 60 |
| 4 | 200 | 169 | 31 | $7.35 \cdot 10^6$ | 8 | 200 | 25 | 60 |

*RA - Radon activity assessed during the period of 20 days by using a continuous radon monitor.

What is claimed is:

1. The method of assessing retrospective long-term radon exposure through the 210Po activity monitoring on a glass surface in-situ by the nuclear track detector technique, said method comprising the steps of:

a) providing an energy degradation foil between the nuclear track detector film and said glass surface to degradate the alpha particle energies of the 210Po plated out on said glass surface;

b) exposing in close contact with said glass surface the first nuclear track detector film to detect the glass alpha activity background and the 210Po alpha activity on said glass surface;

c) removing the 210Po activity from a different section of said glass surface;

d) exposing in a close contact with said different section of said glass surface the second nuclear track detector film to detect the background alpha activity of said glass surface;

e) developing after a predetermined amount of time said first and second nuclear track detector films by etching to determine the alpha particle track density of said first and second nuclear track detector films;

f) determining the net alpha particle track density of the 210Po plated out on said glass surface by subtracting the alpha particle track density of said second nuclear track detector film from the alpha particle track density of said first nuclear track detector film;

g) calculating retrospective radon exposure and long-term average radon activity from the net alpha particle track density.

* * * * *